Figure 1:
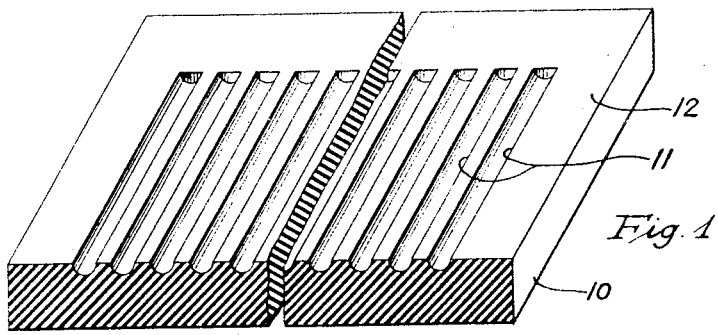

Feb. 7, 1950        C. J. BURKLEY        2,496,932
ANTISKID PNEUMATIC TIRE

Filed Oct. 6, 1948        3 Sheets-Sheet 1

Inventor
Clement J. Burkley

ATTORNEY

Feb. 7, 1950  C. J. BURKLEY  2,496,932
ANTISKID PNEUMATIC TIRE
Filed Oct. 6, 1948  3 Sheets-Sheet 2
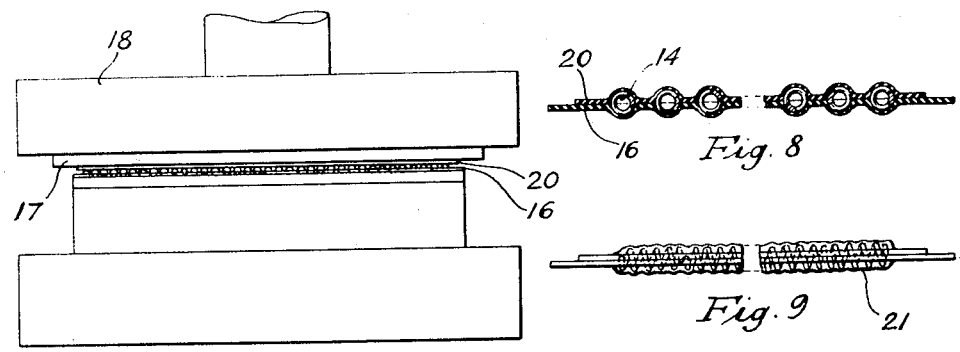
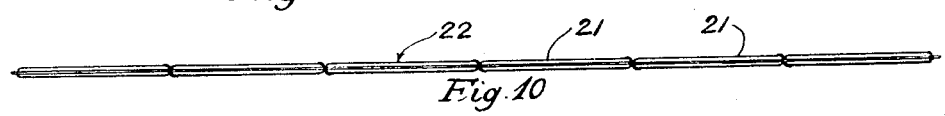
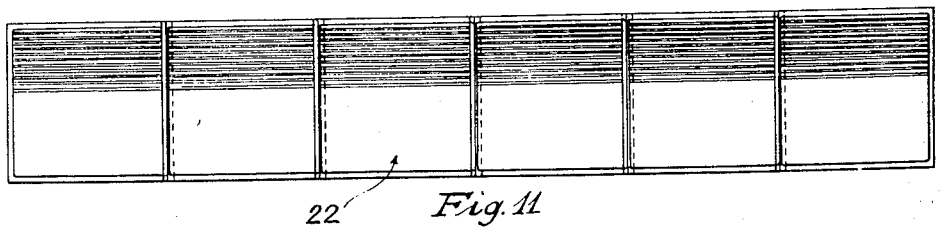
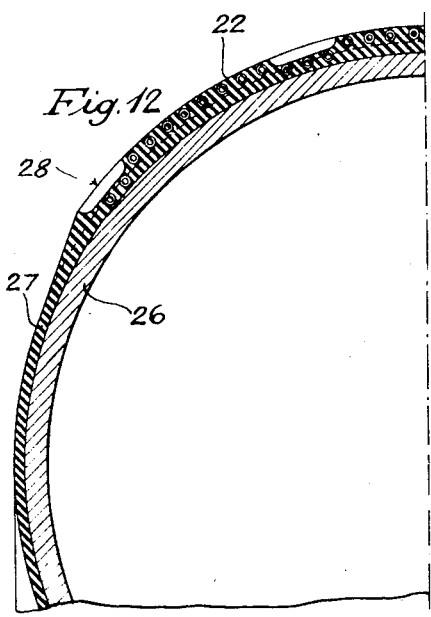
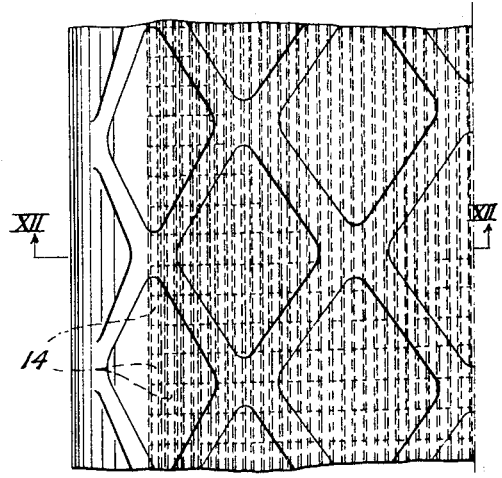
Inventor
Clement J. Burkley
By
ATTORNEY Feb. 7, 1950           C. J. BURKLEY           2,496,932
ANTISKID PNEUMATIC TIRE
Filed Oct. 6, 1948           3 Sheets-Sheet 3
Fig. 14
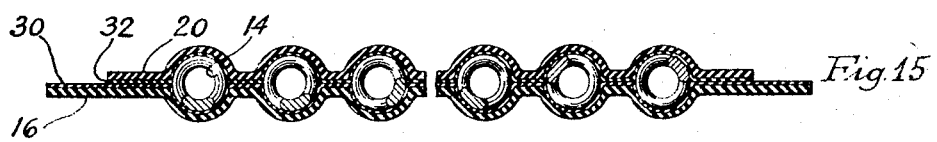
Fig. 15
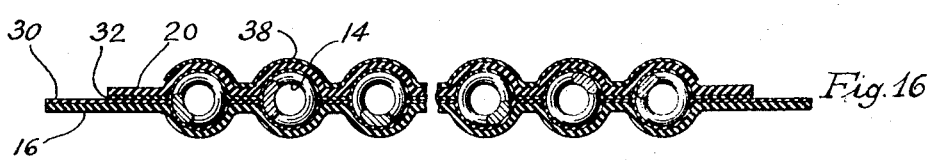
Fig. 16
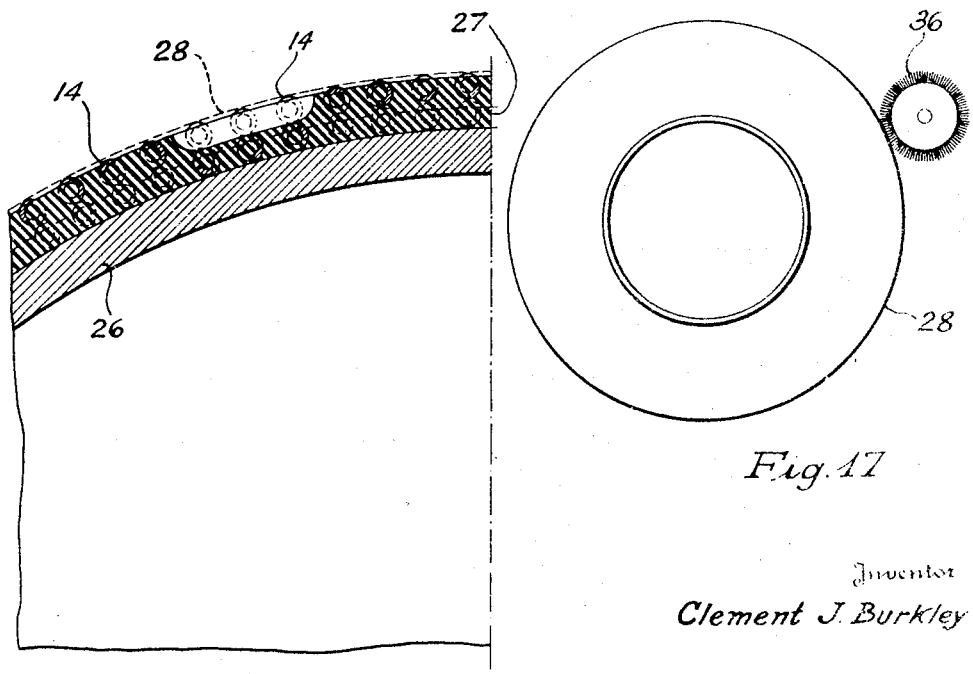
Fig. 17
Fig. 18
Inventor
Clement J. Burkley
ATTORNEY Patented Feb. 7, 1950

2,496,932

UNITED STATES PATENT OFFICE 2,496,932

ANTISKID PNEUMATIC TIRE

Clement J. Burkley, Akron, Ohio, assignor to Wingfoot Corporation, Akron, Ohio, a corporation of Delaware Application October 6, 1948, Serial No. 53,032

4 Claims. (Cl. 152—211)

This invention relates to pneumatic tires. More particularly, the invention is concerned with the tread portion of pneumatic tires having anti-skid properties and embodying short spring elements or segments embedded therein to provide friction means for the prevention of skidding on slippery surfaces.

The anti-skid pneumatic tires of the present invention are particularly advantageous for use under ice and snow conditions. Various forms of tire construction for this purpose are quite well known. Most of the prior art anti-skid pneumatic tires, however, embody metal or spring elements embedded in the tread portion thereof which are substantially coextensive with the tread circumference of the tire. This form of friction element is not only difficult to incorporate in the tread portion of a tire in view of the necessity to conform the element to the mold in which the tire is vulcanized, but also presents certain other disadvantages. Among these disadvantages is the tendency of the long spring of metal elements to become disengaged from the body of the tread portion and to become entangled with the working parts of the vehicle or to be thrown off in the course of operation of the vehicle, endangering persons who may be nearby.

The present invention has for one of its objects the overcoming of these deficiencies by a simplified and improved tread construction embodying short spring segments which can be readily molded in place in the tread portion, rendering the tire capable of use to particular advantage for the landing gear of airplanes as well as other similar vehicles.

It is an object of the present invention to make the inserts in the form of spring segments, small and as light as possible not only to prevent serious injury to persons with whom they may come into contact, but also to prevent damage to the vehicle in the event that they should become loosened or ejected at high speeds. This factor is particularly important in the case of airplane landing gear since serious damage could result to rotating propellers and other vulnerable parts of the plane.

Other objects of the invention will become obvious in the course of the following description of one of the preferred embodiments of the invention.

The instant application is a continuation-in-part of my application Serial No. 490,564 filed June 12, 1943, now abandoned.

Figure 2:
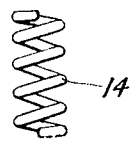
Figure 4:
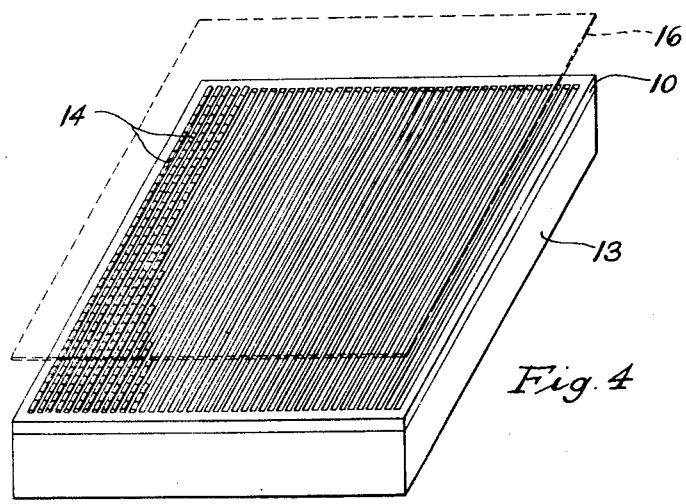
Figure 3:
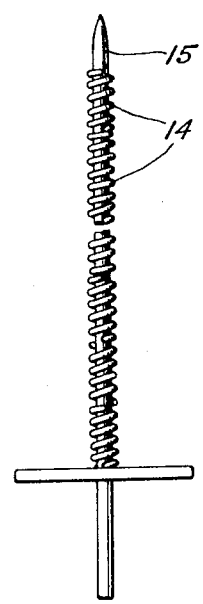
Figure 5:
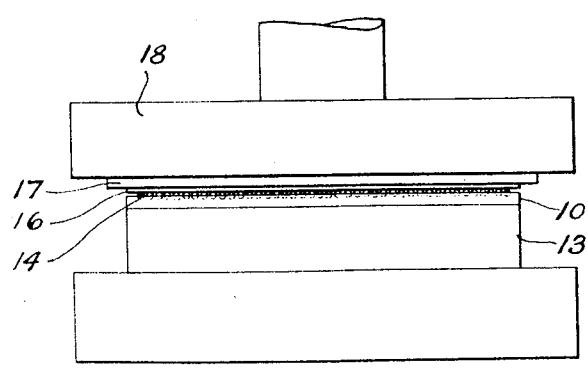

In the accompanying drawings, Fig. 1 is a fragmentary perspective view with parts in section of a grooved mold on which sections of the tire tread are assembled. Fig. 2 is an elevation on an enlarged scale of a helical spring segment of the type employed in the manufacture of the anti-skid tire of the present invention. Fig. 3 is a fragmentary side view of a rod upon which a large number of spring segments are threaded to facilitate filling the grooves in the mold. Fig. 4 is a perspective view of the mold partially filled with spring segments and indicating in dotted lines a sheet of rubber stock ready to be placed upon it. Fig. 5 is a side view of a press for assembling the spring segments with the rubber.

Figure 6:
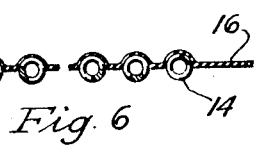

Fig. 6 is a cross-sectional view of a partly finished tread section. Fig. 7 is a view similar to Fig. 5 illustrating the second press operation on the tread section. Fig. 8 is a fragmentary cross-sectional view of an assembled tread section. Fig. 9 is a fragmentary side view of the assembly illustrated in Fig. 8. Fig. 10 is a side view of an assembly of several tread sections making up the full tread length of a tire. Fig. 11 is a plan view of the assembly shown in Fig. 10.

Fig. 12 is a fragmentary cross-sectional view of a pneumatic tire embodying a tread portion prepared according to the present invention. Fig. 13 is a fragmentary plan view of the tread portion illustrated in Fig. 12. Fig. 14 is a view generally similar to Fig. 6, but on an enlarged scale and illustrating a somewhat modified construction. Fig. 15 is a view generally similar to Fig. 8 and modified in accordance with the illustration of the modified construction of Fig. 14. Fig. 16 is a view similar to Fig. 15 showing still another modification of the invention. Fig. 17 is an elevation of the operation of buffing an anti-skid tire. Fig. 18 is a view generally similar to Fig. 12 an on enlarged scale of a buffed tire.

The construction of the anti-skid pneumatic tire of the present invention will best be understood from a description of the method of manufacture thereof. In the course of the following description, the term "rubber" wherever employed shall be understood to include natural rubber, synthetic rubber, a combination of both, or any suitable substitute therefor.

Referring first to Fig. 1 of the drawings, the numeral 10 designates a sustantially rectangularly shaped mold of suitable material, preferably hard rubber, which is provided with relatively closely spaced parallel grooves 11 of substantially half-round cross section with a margin 12 of suitable width. The mold is placed on a rigid base 13 as shown in Fig. 4 and its grooves are filled with a plurality of relatively short, non-tangling helical spring segments 14 of the type illustrated in Fig. 2 and preferably made of brass plated steel wire. These helical spring segments 14 are readily vulcanizable to rubber and are arranged in the grooves 11 of the mold 10 with the aid of a plurality of rods 15 upon which the several spring segments 14 are threaded in end-to-end relation extending coaxially of the rods. A number of spring segments 14 will be disposed in the described end-to-end relation extending over a length sufficient to substantially fill each of the grooves 11 in the mold 10.

Entangling of the spring segments 14 is prevented by forming them with substantially square ends. It is important, in the threading of the spring segments on the rods 15 as well as in their incorporation in the finished tire, to be certain the spring segments will be unattached or separated from each other at their ends. The spring segments 14 are advantageously formed of a length ranging from three-eighths inch to two and one-half inches, the length of the spring segments depending upon the nature and coarseness of the tread design and the size of the tire upon which the tread portion is to be applied. It will be readily understood that where a relatively coarse tread pattern is used, the spring segments may be of greater length and internal diameter than will be the case when a tread pattern is employed in which the recessed and embossed portions of the tread are relatively small. Both of these factors will be determined to some extent at least by the size of the tire upon which the tread is to be applied.

On top of the mold 10 with each of the several grooves 11 having disposed therein a plurality of spring segments 14 in end-to-end co-axial relation is carefully placed, without disturbing the position of the spring segments, a relatively thin sheet 16 of unvulcanized rubber corresponding in size substantially to that of the mold area (see Fig. 4). A fairly thick pad 17 of soft vulcanized rubber partially projecting over the sheet 16 is then placed thereon. The base 13, together with all the parts disposed on the mold 10, is then put under pressure in a press 18 such as that illustrated in Fig. 5.

In this fashion, the sheet 16 is pressed against the several springs 14 until it contacts the top surfaces of the mold. The springs 14 are thus caused to bulge out of the rubber sheet into the soft rubber pad and are made to adhere securely to the rubber sheet 16 to prevent their falling out during subsequent handling. After leaving the press, the rubber sheet with the spring segments attached thereto will possess the corrugated form shown in Fig. 6.

The sheet 16 is next placed upside down on top of the mold 10 so that its corrugations fit into the grooves 11 thereon. A second unvulcanized rubber sheet 20, preferably of slightly smaller area than the unvulcanized rubber sheet 16, is applied so as to create a slight offset in the assembled section. The second sheet 20 is laid on the remaining exposed side of the spring segments 14 and, as before, a soft rubber pad 17 is placed thereon in the manner illustrated in Fig. 7. Pressure is again applied to the assembly by means of a press 18 until the adjacent surfaces of the unvulcanized rubber sheets 16 and 20 are securely united by adhesion, thereby forming a completed tread section indicated generally by the numeral 21 and illustrated in Figs. 8 and 9.

The next step in the construction of an anti-skid pneumatic tire involves the building up of a full length anti-skid tread 22 by cementing together a sufficient number of sections 21 at their corresponding outwardly projecting flat portions, one on top of the corrugations in one section, and the other secured to the bottom of the corrugations of the adjacent section, respectively, as shown in Figs. 10 and 11. This operation brings the spring containing portions of the sections in closely adjacent relation to each other. It will be readily understood that the anti-skid tread 22, instead of being made from a plurality of tread sections 21, as in the manner previously described, could be made in a single length corresponding substantially to the outer circumference of the tire carcass to which it is to be applied.

The assembled anti-skid tread 22 with the several spring segments 14 extending longitudinally thereof in substantially continuous co-axial relation is coated with rubber cement and is thereafter ready to be applied in the conventional manner to a prefabricated tire carcass 26 consisting originally of a plurality of built-up rubberized fabric plies and an outer layer of rubber 27. The tire thus assembled is next vulcanized or cured in any suitable form of mold press after which the tire assumes its toric shape illustrated in Figs. 12 and 13 with the short spring segments 14 embedded in the tread portion thereof.

It will be noted that during the curing of the assembled tire the interstices of the spring segments 14 are completely filled with the flowing rubber and the cylindrical sides of convolutions of the spring segments assume a position substantially flush with the outermost surface of the tread portion of the finished tire. Ordinarily a thin film of rubber remains as a covering over the spring segments at the tread surface and, as a result, the best anti-skid effect of the tire may not be obtained until this film is worn off, enabling the spring convolutions to protrude slightly beyond the surface of the rubber material. The flowing of the rubber into the interstices of the spring segments 14 serves to thoroughly embed or anchor them in the body of the tread portion 22, a feature which is desirable in maintaining the springs 14 in place throughout the normal wear of the tread portion of the tire.

Where there are recesses in the tread pattern impressed on the finished tire, the spring segments or portions thereof are quite readily pressed into the rubber layer of the tire carcass without losing their generally cylindrical shape. Thus, as the tread pattern is worn off the tread portion of the tire, there will still be a sufficient number of spring segments 14 left embedded in the originally recessed portions to keep the tire from skidding and to permit its further use with reasonable efficiency. It will be understood that instead of a single layer of spring segments 14, the tire may, if desired, be provided with two or more superposed layers to facilitate a longer anti-skid life of the tire.

Instead of arranging the rows of spring segments circumferentially of the tire in the manner illustrated in Fig. 11, they may, if desired, run transversely, diagonally, or in any suitable combination of directions. If desired, spaces may be provided longitudinally between adjacent spring segments 14 or between alternate spring elements to facilitate their cooperation with an embossed tread pattern. Any such arrangement as that described can be accomplished by constructing the mold accordingly and no major changes in the method of building the tire tread will be necessitated by such revised arrangements of the spring segments.

A somewhat modified construction of the anti-skid tire of the present invention is illustrated in Figs. 14 and 15 which show the unvulcanized rubber sheets 16 and 20 on the side facing the springs provided with a coat of rubber cement or a layer of tie gum 30 and 32, respectively. The purpose of providing a layer of tie gum 30 and 32 is to obtain the best possible adherence of the springs 14 to the rubber after vulcanization of the tire. The rubber tread may be buffed after vulcanization by the use of a wire buffing wheel 36 (Fig. 17) to cause the springs 14 embedded in the rubber to protrude slightly beyond the rubber tread surface in the manner illustrated in Fig. 18.

Another satisfactory way of causing the springs 14 to protrude beyond the rubber tread surface is provided for in Fig. 16. Here the unvulcanized rubber sheet 20 is covered over the area in which it touches the several springs 14 with a thick layer 38 of non-wear resisting rubber material. After this type of tread has been applied to the prefabricated tire carcass, the spring 14 will be caused to be pressed during the vulcanization operation into the layer of non-wear resisting rubber material 38. No buffing of the tread will be required in this case to make the spring appear above the surface for the reason that in service the surface rubber layer 38 covering the outside of the springs will be rapidly worn off to make it appear as illustrated in Fig. 18.

From the foregoing detailed description of the present invention which is illustrated by example in several modifications, it will be seen that there is disclosed a simple construction of anti-skid tires which will produce highly advantageous results in use. The single spring segments or elements which, as previously indicated, may range from three-eighths inch to two and one-half inches in length, are also of relatively small diameter and are thus very rigid transversely. Ordinarily, the inner diameters of the spring segments will advantageously be about one-fourth their lengths.

Such spring segments provide a good anti-skid medium in that they can present many separate points of contact to the surface traversed by the tire. It will be readily understood also that such a short spring segment having very little weight when accidentally ejected from the wheel of a vehicle can do little or no damage to any object which it might strike.

While certain representative embodiments and details have been shown for the purpose of illustrating the invention, it will be apparent to those skilled in this art that various changes and modifications may be made therein without departing from the spirit or scope of the invention.

I claim:

1. An anti-skid tire having a tread portion formed of at least two superposed laminae of rubber or the like and disposed therebetween a plurality of spaced, generally parallel rows of short helical spring elements ranging in length from approximately three-eighths inch to two and one-half inches and having convolutions which resist deformation, said tread portion having impressed thereon a tread pattern embodying embossed portions periodically interrupted by depressed portions causing parts of the convolutions of at least certain of the spring elements to be disposed in and substantially flush with the surfaces of the embossed portions of the tread pattern.

2. An anti-skid tire having a tread portion comprising a plurality of tread sections each of which is characterized by at least two superposed laminae of rubber or the like between which is disposed a plurality of spaced, generally parallel rows of short helical spring elements ranging in length from approximately three-eighths inch to two and one-half inches and having convolutions which are stiff and resist deformation, said tread portion having a tread pattern embodying discontinuous embossed portions impressed thereon bringing parts of the convolutions of certain of the spring elements substantially flush with the surfaces of the embossed portions and depressing parts of others of the spring elements.

3. An anti-skid tire having a tread portion formed of at least two superposed lamine of rubber or the like, said tread portions having a tread pattern formed thereon characterized by embossed portions periodically interrupted by depressed portions therein, and disposed between the laminae a plurality of spaced, generally parallel rows of short, helical spring elements ranging in length from approximately three-eighths inch to two and one-half inches and having convolutions which resist deformation, said spring elements being arranged to conform to the outline of the tread pattern with their axes in substantially parallel relation to certain of the depressed portions and having parts of the convolutions thereof substantially flush with the surface of said embossed portions.

4. An anti-skid tire having a tread portion formed of at least two superposed laminae of rubber between which are disposed a plurality of generally parallel rows of short helical spring segments ranging in length from approximately three-eighths inch to two and one-half inches and having convolutions which resist deformation, said spring segments being arranged in end-to-end coaxial relation and with portions of their convolutions being substantially exposed at the outermost surface of the tread portion.

CLEMENT J. BURKLEY.

No references cited.